Patented Aug. 14, 1945

2,382,629

UNITED STATES PATENT OFFICE 2,382,629

INTERPOLYMERIZATION PRODUCTS

Herbert Gudgeon and Rowland Hill, Blackley, Manchester, England, assignors to Imperial Chemical Industries Limited, a corporation of Great Britain No Drawing. Application February 28, 1940, Serial No. 321,355. In Great Britain February 28, 1939

14 Claims. (Cl. 260—84)

The present invention relates to the manufacture of new interpolymerization products.

An object of the present invention is to provide valuable new interpolymerization products. A further object is to provide new products advantageously to be used as ingredients for paints and varnishes and capable of being formed into useful shaped articles. Other objects will appear hereinafter in the description below.

According to the present invention we manufacture new interpolymerization products by interpolymerizing a monomeric ester of 1-carboxybutadiene-1:3 with a monomeric compound which is acrylic acid, acrylonitrile or an acrylic ester or an α-methyl or α-chloro substituted derivative thereof.

As monomeric compounds of the above definition there come into consideration besides acrylic acid and acrylonitrile, for example, methacrylic acid, ethyl acrylate, methyl methacrylate and methyl alpha-chloracrylate.

As monomeric esters of 1-carboxybutadiene-1:3 we may use, for example, 1-carbomethoxy-, 1-carboethoxy- or 1-carbobutoxybutadiene-1:3 (see copending application Serial No. 310,471, filed December 21, 1939, now U. S. Patent No. 2,232,944, patented February 25, 1941). We may use such monomeric esters either singly or in mixture. Likewise, in any given interpolymerization we may use one or more of the monomeric compounds which are acrylic acid and derivatives thereof as defined above.

Interpolymerization may conveniently be brought about by the action of heat and/or a polymerization catalyst.

The requisite monomeric reagents may be made to undergo interpolymerization in the form, for example, of their mass mixture. The monomeric reagents may be heated, for example, at a temperature between 35° C. and 100° C. Suitable catalysts for the process are, for example, organic and inorganic peroxides such as benzoyl peroxide and hydrogen peroxide and peracids and salts thereof such as perbenzoic acid and ammonium persulphate. It will readily be understood that if such a mass mixture is caused to interpolymerize in a suitably shaped vessel, the interpolymerization product can be obtained in the form of shaped masses such as, for example, rods or sheets.

Alternatively, the requisite monomeric reagents either separately or together, may first be brought into the form of an aqueous emulsion or dispersion and then caused to interpolymerize. Where the latter method is used the interpolymerization product will be obtained as an emulsion or dispersion of a fineness depending on the particular procedure adopted and from which the interpolymerization product can be isolated in concentrated form by breaking the emulsion or flocculating the dispersion, if necessary, and filtering or decanting. Where interpolymerization is to be brought about in aqueous emulsions, and especially if it is desired to have the resulting interpolymerization product in the form of a stable aqueous emulsion or dispersion, it is preferable to use an emulsifying agent in preparing the original monomer emulsion. Useful emulsifying agents are, for example, inorganic acid esters of high molecular weight aliphatic alcohols such as cetyl sodium sulphate, soap-like emulsifiers such as ammonium oleate, and quaternary ammonium or phosphonium and ternary sulphonium salts containing high molecular-weight aliphatic hydrocarbon radicals. As an example of such quaternary ammonium salts may be mentioned cetyl-p-dimethylaminobenzoate methosulphate. Persalts, such as ammonium persulphate, already referred to above as interpolymerization catalysts, also serve as emulsifying agents. There may also be employed for this purpose high molecular polymeric compounds yielding viscous aqueous solutions, such as, for example, gum tragacanth, water-soluble starches, water-soluble methyl celluloses, polyvinyl alcohol, partly saponified water-soluble polyvinyl esters, polyacrylic acid and polymethacrylic acids (preferably in the form of their water-soluble alkali salts) and interpolymers which are derived from acrylic or methacrylic acid and other polymerizable compounds, e. g. an acrylic ester or a methacrylic ester, and form water-soluble alkali salts.

The invention may also be carried out, for example, by dissolving the requisite monomeric reagents in an organic solvent or solvents and then causing them to interpolymerize. In this case the organic solvent or solvents employed may, if desired, be non-solvents for the resulting interpolymerization product. As useful solvents for the monomeric reagents there are, for example, aromatic hydrocarbons such as benzene or toluene, ketones such as acetone or cyclohexanone, alcohols such as ethyl alcohol and esters such as ethyl acetate.

Interpolymerization products manufactured in accordance with the present invention range in physical properties from clear, tough, flexible resins to tough, elastic, rubbery masses. The interpolymerization products are useful ingredients for paints and varnishes and they can be formed into useful shaped articles by compression or injection moulding. When obtained in the form of aqueous emulsions or dispersions they may be applied to surfaces, and after the water has evaporated remain thereon as transparent films or coatings.

Where it is desired to have coloured interpolymerization products or to introduce plasticizers or inert fillers, the requisite colouring matters, plasticizers or fillers may be incorporated with the monomeric reagents before interpolymerization or they may be incorporated after interpolymerisation.

The invention is illustrated but not limited by the following examples in which the parts are by weight.

Example 1

0.5 part of benzoyl peroxide is added to a mixture of 50 parts of 1-carbomethoxybutadiene-1:3 and 50 parts of methyl alpha-chloracrylate. The whole is heated for 24 hours at 100° C. The new interpolymerization product so formed is a clear, tough, flexible resin which is readily soluble in aromatic hydrocarbons such as benzene and toluene and in acetone and methyl-ethyl-ketone.

Methyl-alpha-chloracrylate when polymerized under similar conditions but in the absence of 1-carbomethoxy-butadiene-1:3, is almost insoluble in the solvents referred to.

Example 2

67 parts of 1-carbomethoxybutadiene-1:3 and 33 parts of acrylonitrile are emulsified in 400 parts of water containing 8 parts of cetyl sodium sulphate, 0.95 part of glacial acetic acid and 0.02 part of sodium acetate. Interpolymerization is then brought about by heating the emulsion so-obtained for 24 hours at 60° C. and then allowing it to stand at atmospheric temperature for a further two weeks. To the emulsion so-obtained there is added about an equal bulk of methyl alcohol whereupon the new interpolymerization product separates as a rubbery coagulum. When washed and dried on a rubber roller mill the coagulum is obtained as a tough, elastic sheet.

Example 3

70 parts of 1-carbomethoxybutadiene-1:3 and 30 parts of methyl methacrylate are emulsified by stirring into 180 parts of water containing 0.45 part of cetyl sodium sulphate, 7.5 parts of the sodium salt of an interpolymer of methacrylic acid with methyl methacrylate, 7.5 parts of sodium carbonate and 10 parts of hydrogen peroxide (20 vols.). The so-formed emulsion is heated at 75° C. with continued stirring for 11 hours. The resulting dispersion is free from clots of coagulated polymer and remains stable on storage. When the dispersion is applied to a surface, the interpolymer remains, after evaporation of the water, as a colourless, tough, transparent, somewhat elastic coating.

Example 4

310 parts of 1-carbomethoxybutadiene-1:3 are mixed with 270 parts of methacrylic acid and 12.0 parts of benzoyl peroxide. After warming to about 40° C. to dissolve the benzoyl peroxide the mixture is added to 657 parts of water containing 0.6 part of gum tragacanth. The whole is warmed to 90° C. and stirring is maintained for 3 hours. Stirring is then stopped and the product immediately settles to the bottom of the vessel. This supernatant liquor is syphoned off and the product washed several times by decantation with water. The product is then dried in a vacuum oven at 40° C. It forms a pale straw coloured powder which dissolves in warm dilute aqueous sodium hydroxide to a viscous solution.

Example 5

200 parts of 1-carbomethoxybutadiene-1:3 and 200 parts of n-butyl methacrylate are mixed with 300 parts of xylene. 4 parts of benzoyl peroxide are added and the clear solution heated at 100° C. for 36 hours. On cooling, the solution is somewhat viscous. It may be applied directly as a coating composition forming pale coloured transparent flexible coatings, the hardness of which can be improved by heating at 100° C., or even higher temperatures.

Example 6

100 parts of 1-carbo-$\beta$-ethoxyethylbutadiene-1:3 and 200 parts of methyl methacrylate are stirred into 600 parts of water containing 24 parts of cetyl sodium sulphate, 3 parts of ammonium persulphate and 3.6 parts of glacial acetic acid. The so-formed emulsion or dispersion is heated with rapid stirring at 75° C. for 18 hours. On interrupting the agitation and cooling, the product separates as a stiff, putty-like mass. This is kneaded in warm water to remove water-soluble impurities and dried. The product is very tough and resinous, and soon softens on warming.

Example 7

200 parts of 1-carboethoxybutadiene-1:3 and 200 parts of acrylic nitrile are rapidly stirred into 600 parts of water containing 12 parts of cetyl trimethylammonium bromide and 12 parts of ammonium persulphate at room temperature. The resulting dispersion or emulsion is heated with rapid stirring to 70° C. A stiff, rubber-like mass slowly separates. After 2½ hours, steam is blown through the mass to remove a small amount of residual monomers, and the product dried. It is tough, somewhat rubber-like and insoluble in the usual organic solvents, such as benzene.

As many apparently widely different embodiments of this invention may be made without departing from the spirit and scope thereof, it is to be understood that we do not limit ourselves to the specific embodiments thereof except as defined in the appended claims.

We claim:

1. Process which comprises polymerizing a mixture of a 1-carboalkoxybutadiene-1,3 and a compound of the formula $$CH_2=C-Y$$
$$\phantom{CH_2=C-}\mid$$
$$\phantom{CH_2=C-}X$$

wherein X is a member of the group consisting of —H, —Cl, and —CH$_3$ and Y is a member of the group consisting of —CN, —COOH, and —COOR, where R is a hydrocarbon radical.

2. Process which comprises polymerizing a mixture of a 1-carboalkoxybutadiene-1,3 and acrylonitrile.

3. Process which comprises polymerizing a mixture of 1-carbomethoxybutadiene-1,3 and acrylonitrile.

4. Process which comprises polymerizing a mixture of a 1-carboalkoxybutadiene-1,3 and methyl methacrylate.

5. Process which comprises polymerizing a mixture of 1-carbomethoxybutadiene-1,3 and methyl methacrylate.

6. Process which comprises polymerizing a mixture of a 1-carboalkoxybutadiene-1,3 and methyl alphachloroacrylate.

7. Process which comprises polymerizing a mixture of 1-carbomethoxybutadiene-1,3 and methyl alphachloroacrylate.

8. An interpolymer of a 1-carboalkoxybutadiene-1,3 and a compound of the formula $$CH_2=C-Y$$
$$\phantom{CH_2=C-}X$$

wherein X is a member of the group consisting of —H, —Cl, and —CH₃ and Y is a member of the group consisting of —CN, —COOH, and —COOR where R is a hydrocarbon radical.

9. An interpolymer of a 1-carboalkoxybutadiene-1,3 and acrylonitrile.

10. An interpolymer of 1-carbomethoxybutadiene-1,3 and acrylonitrile.

11. An interpolymer of a 1-carboalkoxybutadiene-1,3 and methyl methacrylate.

12. An interpolymer of 1-carbomethoxybutadiene-1,3 and methyl methacrylate.

13. An interpolymer of a 1-carboalkoxybutadiene-1,3 and methyl alpha-chloroacrylate.

14. An interpolymer of 1-carbomethoxybutadiene-1,3 and methyl alpha-chloroacrylate.

HERBERT GUDGEON.
ROWLAND HILL.